United States Patent Office 2,702,264
Patented Feb. 15, 1955

2,702,264

ENTERIC COATED TABLET

Heinrich Kläui, Riehen, Switzerland, assignor to Hoffmann-La Roche Inc., Nutley, N. J., a corporation of New Jersey No Drawing. Application March 8, 1951,
Serial No. 214,633

Claims priority, application Switzerland March 15, 1950

5 Claims. (Cl. 167—82)

This invention relates to an enteric coated tablet and to the coating therefor. Broadly, the invention is concerned with a coated tablet wherein the coating material is practically insoluble in the secretions of the stomach, but which is attacked by the secretions of the intestine. More particularly, the invention relates to an enteric coated tablet wherein the coating material comprises, in predominant proportions, a difficultly water-soluble to water-insoluble synthetic film-forming polymer selected from the group consisting of polyvinyl acetals, polyvinyl ethers, polyvinyl acetates, copolymers of vinyl chloride with vinyl acetate, partially hydrolyzed polyvinyl acetates, polyacrylic acid esters and polymethacrylic acid esters, and an acid group-carrying synthetic polymer selected from the group consisting of polyacrylic acids, polymethacrylic acids, partial esters of sulfuric acid with polyvinyl alcohol which have free acid hydrogen, and partial esters of phosphoric acid with polyvinyl alcohol which have free acid hydrogen. Polyvinyl acetates are particularly useful as the difficultly water-soluble or water-insoluble component. In addition to the above specified major components, the coating material can optionally contain also minor proportions of certain additives: plasticizers such as esters of saturated and unsaturated fatty acids and of hydroxy carboxylic acids with alcohols and glycols, as well as mono- and dialkyl phthalates; fillers such as talc, metal soaps, carbon, kaolin, waxes and mixtures thereof; and solubility modifying agents such as fatty alcohols and fatty acids containing from 10 to 18 carbon atoms.

The properties of the final coating depend upon the proportion of the two types of polymers which form the predominant constituents thereof. Ordinarily, this proportion is approximately 1:1, the greater the proportion of acid group-carrying polymer which is used, the greater is the solubility of the coating material in the intestinal juices. The properties of the coating material are further influenced by the degree of polymerization of the synthetic polymers which enter into its composition. Still further changes in the properties of the coating can be effected by incorporation in the coating mix of the additives specified above.

It will be understood that the tablet coating material of the invention is difficultly attacked in the acid medium of the stomach, whereas when the tablet enters the alkaline medium of the intestine, the coating disintegrates as a result of reaction of the alkaline medium with the acid group-carrying polymer component thereof.

The coating composition of the invention can be applied to tablets from solutions of said composition in organic solvents or solvent mixtures which possess sufficient solvent action upon the constituents and which do not undergo undesired reactions with either the constituents of the coating or the material to be coated. Especially suitable for this purpose are lower alcohols, ketones and esters. Suspensions of the coating material in a suitable liquid medium can also be employed, in which case it is desirable to add a metal soap such as magnesium, calcium or aluminum stearate to the suspension. Dusting agents may be used if needed during the coating operation to prevent sticking. In certain cases, a preliminary treatment of the surface of the material to be coated may also be desirable. For this purpose, surface active substances and/or fatty acids (particularly those having 10 to 18 carbon atoms) are appropriate; such substances may be applied to the material to be coated as a preliminary layer, or may be incorporated in the coating composition.

The enteric coated tablets of the invention show a high degree of stability on storage. The invention is therefore particularly suitable for use in the manufacture of tablets containing unstable active substances such as vitamins, hormones and similar materials. Such labile substances may be placed in the core of the tablet or they may be added to the coating mixture so that they will be found in the coat of the finished tablet. Substances which would otherwise react with each other can be kept separate from each other by this method, one being placed in the core, and the other being added to the coating mixture.

The following examples are illustrative but not limitative of coating materials which can be employed in practicing the invention.

Example 1

4.55 parts by weight of polymethacrylic acid, 5.45 parts by weight of polyvinyl acetate, 0.9 part by weight of stearic acid and 0.9 part by weight of dioctyl phthalate are dissolved in 65 parts by weight of a 1:1 mixture of alcohol and acetone. When using this solution for the coating of tablets, 20 parts by weight of talcum can be used as a dusting powder, or the talcum can be suspended in the solution.

Example 2

12.5 parts by weight of polymethacrylic acid, 12 parts by weight of polyvinyl acetate, 4 parts by weight of cellulose nitrate, 2.47 parts by weight of myristic acid and 2.47 parts by weight of tetrahydrofurfuryl oleate are dissolved in 200 parts by weight of Neosol (which is essentially a denatured alcohol solvent marketed by the Shell Chemical Corporation). A mixture of 45 parts by weight of talcum and 15 parts by weight of magnesium stearate can also be added.

Example 3

2.0 parts by weight of polymethacrylic acid, 3.0 parts by weight of partially hydrolyzed polyvinyl acetate (saponified to the extent of 47 per cent) and 0.1 part by weight of cetyl alcohol are dissolved in a mixture of methanol, isopropanol and water.

Example 4

1.0 part by weight of polymethacrylic acid, 1.2 parts by weight of a copolymer of vinyl chloride with vinyl acetate in the approximate ratio 3:1, 0.22 part by weight of stearic acid and 0.22 part by weight of dioctyl phthalate are dissolved in a mixture of tetrahydrofurfuryl alcohol and ethyl acetate. Dusting agent (optional): talcum/magnesium stearate 1:1.

Example 5

2.0 parts by weight of polyacrylic acid, 3.0 parts by weight of polyvinyl acetate, 0.45 part by weight of stearic acid and 0.45 part by weight of tetrahydrofurfuryl oleate are dissolved in 45 parts by weight of methanol/acetone 1:1. Dusting agent (optional): 5 parts by weight of talcum/magnesium stearate 1:1.

I claim:

1. An enteric coated tablet comprising a therapeutically active material surrounded by a coating which contains, in predominant proportions, a mixture of (1) a difficultly water-soluble to water-insoluble synthetic film-forming polymer selected from the group consisting of polyvinyl acetate, partially hydrolyzed polyvinyl acetate, copolymers of vinyl acetate with vinyl chloride, and methyl esters of polyacrylic acid and of polymethacrylic acid, and (2) an acid group-carrying synthetic polymer selected from the group consisting of polyacrylic acid and polymethacrylic acid.

2. A tablet according to claim 1 wherein the difficultly water-soluble to water-insoluble synthetic film-forming polymer is polyvinyl acetate and the acid group-carrying synthetic polymer is polymethacrylic acid.

3. A tablet according to claim 1 wherein the difficultly water-soluble to water-insoluble synthetic film-forming polymer is polyvinyl acetate and the acid group-carrying synthetic polymer is polyacrylic acid.

4. A tablet according to claim 1 wherein the difficultly water-soluble to water-insoluble synthetic film-forming polymer is a copolymer of vinyl acetate with vinyl chloride and the acid group-carrying synthetic polymer is polymethacrylic acid.

5. A tablet according to claim 1 wherein the difficultly water-soluble to water-insoluble synthetic film-forming polymer is partially hydrolyzed polyvinyl acetate and the acid group-carrying synthetic polymer is polymethacrylic acid.

References Cited in the file of this patent

UNITED STATES PATENTS

| | | |
|---|---|---|
| 2,066,105 | Hagedorn et al. | Dec. 29, 1936 |
| 2,072,303 | Hermann | Mar. 2, 1937 |
| 2,074,647 | Hagedorn et al. | Mar. 23, 1937 |
| 2,215,196 | Schlack | Sept. 17, 1940 |
| 2,390,088 | Fox | Dec. 4, 1945 |
| 2,419,880 | Blyler et al. | Apr. 29, 1947 |

FOREIGN PATENTS

| | | |
|---|---|---|
| 885,178 | France | May 17, 1943 |